3,441,630
PROCESS FOR PREPARING LINEAR OLEFINS
Arthur W. Langer, Jr., Watchung, and Herschel T. White, Montclair, N.J., assignors to Esso Research and Engineering Company, a corporation of Delaware
No Drawing. Continuation-in-part of application Ser. No. 428,836, Jan. 28, 1965. This application July 1, 1966, Ser. No. 562,132
Int. Cl. C07c 3/10; C08d 3/04
U.S. Cl. 260—683.15          10 Claims

ABSTRACT OF THE DISCLOSURE

Ethylene is polymerized to form low molecular weight linear alpha olefins by reaction above 50 p.s.i.a., below 25° C. and in the presence of a catalyst which is the reaction product of an aluminum alkyl and a transition metal halide, the reaction being effected in a polar solvent, the the product being useful as a chemical intermediate.

This application is a continuation-in-part of Ser. No. 428,836, filed Jan. 28, 1965 and now abandoned, which in turn is a continuation-in-part of Ser. No. 55,845, filed Sept. 8, 1960, which is now U.S. Patent No. 3,168,588.

This invention relates to a novel method of preparing linear olefins. In particular, this invention relates to a novel process for polymerizing ethylene to obtain a distribution of linear alpha olefin products having a number average molecular weight of from about 70 to about 300. More particularly, this invention relates to a novel process for polymerizing ethylene to obtain a product comprising at least 90 mole percent even numbered linear olefins having molecular weights in the range of from 56 to 2000. Most preferably, this invention relates to a process for polymerizing ethylene to produce a product comprising essentially linear olefins in the $C_4$ to $C_{50}$ range.

It has been shown in the prior art (U.S. Patent No. 2,993,942) that hydrocarbon lubricating oils having a molecular weight in the range of 80 to 2000 could be prepared by polymerizing ethylene with controlled catalyst, diluents and under controlled temperatures. The catalyst consisted of a transition metal halide and a halogenated aluminum alkyl compound. It has also been found that increased oil yields, catalyst reactivity and improved molecular weight control could be obtained by the addition of a minor amount of a lower alkanol, as a catalyst modifier to the reaction system. Both the modified and unmodified systems described above resulted, under the conditions in the reaction in the production of major portions of other than linear alpha olefin products, particularly Type II (RHC=CHR), Type III

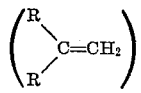

and

Type IV

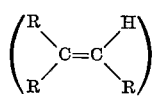

olefins, the relative amount of each type being dependent upon the selection of solvent for the reaction.

It has now been discovered that ethylene can be polymerized under controlled conditions to produce a reaction product containing at least 9 mole percent linear olefin products having a number average molecular weight of up to about 300. The process of this invention requires the control of certain critical reaction variables comprising the mole ratio of ethylene to product, the use of a particular soluble catalyst, and temperature and pressure ranges.

The catalyst employed in this invention is a critical feature in obtaining the desired low molecular weight linear olefin polymers. The catalyst of this invention is a complex reaction product which is substantially soluble in the polymerization system and is obtained by mixing a reducible heavy transition metal halide selected from Group IV–B to VI–B or VIII metal with an aluminum alkyl compound such that the ultimate formula of the aluminum alkyl compound is $AlR_nX_{3-n}$ wherein $n$ is equal to or greater than 1 but less than 2, R is alkyl, cycloalkyl or aralkyl, preferably containing 1 to 20 carbon atoms, for example, methyl ethyl, hexyl, decyl, dodecyl, isobutyl, cyclohexyl, benzyl, etc., and X is Cl, Br or I. While most transition metal halides are suitable components of the catalyst complex when the desired product is the branched chain olefins of the prior art, it has been found that compounds such as $VCl_4$ and $FeCl_3$ are unsuitable for the preparation of linear alpha olefins. The preferred transition metal catalyst component is a titanium compound having a valency of 3 or 4, preferably 4, and may be represented by the formula: $TiX_aA_b$ wherein $a=3$ or 4, $b=0$ or 1 and $a+b=3$ or 4, $X=Cl$ or $Br$ and A is Cl or Br or an anion derived from a protonic compound such as an alcohol (R'OH) or a carboxylic acid (R'COOH). The R' of the protonic compound may be an alkyl, aryl, aralkyl or cycloalkyl group. The $TiX_aA_b$ component may be made in situ by reacting $TiX_4$ with the protonic compound. Thus, the preferred transition metal component of this invention may be selected from the group $TiX_4$, $TiX_3OR'$ and $TiX_3OOCR'$. Typical examples of such compounds are $TiCl_4$, $TiBr_4$, $TiX_3OC_2H_5$ and

$TiX_3OOCCH_3$

As set forth above, it is essential that the aluminum alkyl catalyst after reaction with the transition metal halide have the formula $AlR_nX_{3-n}$. The aluminum alkyl compound is employed in a molar ratio to the transition metal halide of 0.5/1 to 100/1, preferably 1/1 to 20/1, more preferably 1/1 to 12/1. In an embodiment using a dialkyl aluminum halide, e.g., diethyl aluminum chloride, the aluminum compounds is preferably employed in a molar ratio to the transition metal compound of 1/1. In less preferred embodiments, hydrocarbon aluminum derivatives such as aluminum triethyl and aluminum triisobutyl may be employed as the starting aluminum compounds. These latter materials, however, require higher ratios of transition metal halide to aluminum compound and due to the varied nature of the catalyst complex may in some instances result either in low activity, formation of higher molecular weight solid polymers or excessive branching and isomerization of the olefin products. Mixtures of the alkyl aluminum compounds may be used advantageously to control catalyst activity and product distribution. Catalyst concentration is normally in the range of 0.1 to 10 grams per liter of diluent.

Ethylene is unique in the instant invention in that other olefins do not respond to give linear alpha olefins. Therefore, it is desirable to use essentially pure ethylene or mixtures of ethylene with inert gases as the feed for the process of this invention. Ethylene feeds containing minor amounts of other olefins may be used provided that the extent of copolymerization does not decrease product linearity below 90%.

Alcohols may be used to modify the catalysts to control product molecular weight, permit operation at higher temperatures and/or lower pressures with improved selectivity, etc. However, alcohols are not essential for this process if the catalyst composition and polymerization conditions are controlled within a critical range.

The lower alkanols which may be utilized are those in the $C_1$ to $C_8$ range, preferably $C_1$ to $C_4$. The improvement from the use of the alkanol increases with molecular weight within the stated range. It has also been found that the structure of the alkanol is important. For the butanol series the yield increased markedly upon changing from primary to secondary to tertiary alcohol. Also, the selectivity to polymer oil (lower average molecular weight) was considerably higher for secondary butanol and tertiary butanol than for isobutanol. Thus, the alkanols that can be used include methanol, ethanol, n-propanol, isopropanol, n-butanol, sec-butanol, tertiary butanol, isobutanol and all of the $C_5$ and $C_6$ alcohols. $C_3$ to $C_6$ diols in which the hydroxy groups are not attached to adjacent carbon atoms are also useful. Especially preferred and desirable are: tertiary butanol, secondary butanol, iso- or n-butanol, and isopropanol. These alkanols are utilized in a minor amount, i.e., so that the ratio of ROH/R (based on aluminum alkyl) after reduction reduction of the transition metal is not greater than 0.5 (preferably 0.2 to 0.33). The alkanol can be added either to the transition metal halide or the aluminum alkyl halide prior to the addition of the other component. It is preferred to add it, however, to the aluminum alkyl halide.

Although Lewis bases, such as ethers or tertiary amines, are known to be effective additives for making solid polymers at higher rates with Ziegler-type catalysts, their use with the present catalysts leads to drastic loss of activity and selectivity to liquid linear olefins. Thus, the mode of action of this catalyst under the conditions of this invention appears to be quite different from the conventional catalysts.

Polymerization diluent is a critical feature of this invention. The useable diluents are polar aromatic hydrocarbon and halohydrocarbon solvents. Aliphatic and naphthenic diluents are completely unsatisfactory when used alone since they produce only high molecular weight, solid polyethylene. The preferred diluents are aromatic and halogenated aromatic solvents since they result in the production of linear alpha olefins in the desired molecular weight range while employing the most efficient temperatures and ethylene pressures. Less preferred solvents are halogenated aliphatic compounds which, while capable of being employed in the process of preparing linear alpha olefins, require the utilization of higher pressures to achieve average molecular weights of the same order as the preferred solvents. The preferred diluents include halogenated aromatics such as chlorobenzene, dichlorobenzene, chlorotoluene, etc., and aromatics such as benzene, toluene, xylene, tetrahydronaphthalene, etc. The suitable halogenated aliphatic diluents include methyl chloride, ethyl chloride, dichloromethane, etc. Mixtures of these diluents may be used. Also, mixtures of the above types with aliphatic or naphthenic solvents may be used provided the polar types comprise a minimum of about 40% of the total. The diluent or diluent mixture may be used to control the product molecular weight distribution to obtain maximum selectivity to the desired olefin products.

The critical variable with respect to the selective synthesis of linear alpha olefins is the ethylene pressure. The prior art obtained highly branched olefins (60%) when using the closely related catalyst and diluent systems at pressures of 7 to 30 p.s.i.g. It has now been found that ethylene pressures above 50 p.s.i.a. are essential for making linear olefins in high selectivities. Although some variations are permitted depending upon the catalyst composition, diluent and temperature, the perferred pressures are above about 80 to 100 p.s.i.a. in order to produce commercially attractive yields (at least above 5 weight percent and preferably above 10 weight percent olefins in the reactor effluent, effluent being diluent and reaction product) of linear alpha olefins having a purity greater than about 90%. The most preferred range is above 100 and further, above 500 p.s.i.a. ethylene pressure. At very high ethylene pressures the process may become uneconomical because of the equipment requirements and ethylene recycle.

The most critical variable found with respect to the selective snythesis of linear olefins is the ethylene concentration. It has been found that the ratio of moles of ethylene to the moles of products must be above 0.8 throughout the reaction in order to effect the selective synthesis of ethylene to linear olefins. The preferred ratio of ethylene to products is above about 2. The upper limit of the mole ratio of ethylene to product is not critical. The mole ratio of ethylene to product must be above 0.8 or the product formed contains more than 10% branched chain olefins at product concentrations required to produce commercially attractive yields.

The maximum temperature employable in the process for obtaining linear alpha olefins is about +25° C. Preferably temperatures in the range of −30° C. to +10° C. are employed. The selection of a particular temperature within the above-specified range for achieving the highest selectivity to linear alpha olefins is dependent upon the choice of solvent, catalyst and ethylene pressure.

Reaction times are not particularly critical when operating under the preferred conditions, and they will normally be in the range of 0.1 to 5 hours to obtain product concentrations above 5 weight percent in the diluent. The process may be carried out in batch or continuous operation. However, high product purity and high concentration are achieved most easily in batch reactions or in continuous systems operating under substantially plug flow conditions. A reactor may consist of a long pipe through which the diluent and catalyst flow with ethylene being introduced at many points along the pipe to maintain the desired ethylene concentration. In such a system, monomer concentration need not be constant but may be controlled differently in different sections of the reactor to achieve the best balance of activity, molecular weight and product purity.

The invention will be further understood by reference to the following examples.

EXAMPLE 1

A solution of 0.006 mole $TiCl_4$ in 400 ml. chlorobenzene was added to a stirred autoclave under dry nitrogen. Ethylene was added at 20° C. and 3 to 5 p.s.i.a. for 5 to 8 minutes followed by a solution of 0.006 mole $AlEt_2Cl$ and 0.012 mole $AlEtCl_2$ in 100 ml. chlorobenzene. The mixture was stirred 30 minutes for the catalyst pretreatment. The temperature was then reduced to −5° C. and the ethylene pressure was increased to 20 p.s.i.a. in Run 1 and 40 p.s.i.a. in Run 2. The high purity ethylene was added continuously to maintain the respective pressures. After 2.5 hours for Run 1 and 1 hour for Run 2, the reactions were terminated by draining the reactor contents into 20 ml. isopropyl alcohol. The volume increase amounted to 85 ml. in Run 1 and 70 ml. in Run 2.

Upon standing, the reaction solution from Run 1 remained liquid, whereas the initially clear solution from Run 2 crystallized. This showed that the product obtained in Run 2 at the higher pressure contained linear, crystallizable olefins. Upon distillation of the product from Run 2 to remove chlorobenzene, the 135° C. bottoms amounted to 52.8 grams which was predominantly wax. This is in contrast to Run 1 and the atmospheric pressure polymerizations in the art which made lubricating oils or vaseline-like products having low solidifying points because of their branched structures.

EXAMPLE 2

A series of runs were made to determine the effect of ethylene pressure on product linearity. All were carried out at −20° C. using 500 ml. of either chlorobenzene or xylene diluent. The proportions of catalyst components were maintained constant, although total catalyst concentration was varied by a factor of four. The TiCl$_4$ in 400 ml. diluent was added to the reactor under dry nitrogen and cooled to −20° C. The t-butyl alcohol and AlEt$_2$Cl were mixed 5 minutes in 100 ml. diluent before adding the AlEtCl$_2$. The latter was added to the reactor and the total mixture allowed to react 15 minutes at −20° C. High purity ethylene was obtained by passing commercial C.P. ethylene over copper oxide at 205° C. to remove oxygen and then through 3A molecular sieves to remove water. It was stored in a one gallon reservoir at 1000 p.s.i.g. After the catalyst pretreatment, the reactor was brought to reaction pressure very rapidly while the reactor contents were subjected to high speed stirring. Ethylene was added as necessary to maintain pressure and the temperature was kept at −20° C. by circulating coolant through coils around the reactor.

The results are summarized in Table I. After killing the catalyst with about 25 to 50 ml. methanol containing NaOH, the product was water-washed twice and dried over K$_2$CO$_3$. The products were analyzed quantitatively for olefin types by infrared, and the split between linear and branched products was determined by quantitative gas chromatography on a sample of total reactor product. Using a 4-foot column of silicone gum rubber and temperature programming, it was possible to obtain the yield of each product up to C$_{36}$H$_{72}$. Product linearity is expressed as mole percent in the C$_{12-20}$ fraction. It was compared on the C$_{12-20}$ cuts because this was the most accurate analysis considering volatility losses from C$_{4-10}$ fraction and poorer G.C. resolution of the branched and linear olefins above C$_{20}$. The linearity of the total product is much higher than that shown for the C$_{12-20}$ fraction because in all pressure runs the C$_{4-10}$ fraction is essentially 100% linear, and it is a major portion of the total product.

As shown in Table I, the selectivity to linear alpha olefins increases sharply above about 50 p.s.i.a. and becomes greater than 90% above about 100 p.s.i.a. At still higher ethylene pressures, selectivity rapidly approaches 100% in the C$_{12-20}$ fraction. Excellent results were obtained with either chlorobenzene or xylene diluent. In addition to the effect on olefin linearity, ethylene pressure may be used together with catalyst composition, solvent polarity and polymerization temperature to control the product molecular weight. As shown in Table I for chlorobenzene diluent, the number average molecular weight increased from 98.8 at atmospheric pressure to 147 at 500 p.s.i.a.

EXAMPLE 3

The most effective alkyl aluminum halide composition has the formula AlR$_n$X$_{3-n}$, where $n$ is at least 1 but less than 2. This is shown in the following experiments which were carried out in the manner described in Example 2, except that no alcohol modifier was used and the AlR$_n$X$_{3-n}$ was varied from AlEtCl$_2$ to AlEt$_{1.5}$Cl$_{1.5}$ to AlEt$_2$Cl. The results summarized in Table II show that AlEtCl$_2$ produces the desired products but activity is low; AlEt$_{1.5}$Cl$_{1.5}$ is effective and more active; AlEt$_2$Cl is least active for making liquid olefins and yields almost exclusively high molecular weight polyethylene. The small amount of liquid olefins made with AlEt$_2$Cl probably came from the small amount (less than 1 mole per mole TiCl$_4$) of AlEtCl$_2$ which would be obtained by reducing or alkylating the TiCl$_4$. Since a 12/1 Al/Ti ratio was used, the main product (solid polymer) was obtained from the >11 AlEt$_2$Cl rather than the <1 AlEtCl$_2$.

However, in Run 13 the catalyst consisted of equimolar amounts of AlEt$_2$Cl and TiCl$_4$. Therefore, after alkylating or reducing the TiCl$_4$, the AlEt$_2$Cl would have been converted to AlEtCl$_2$ to an appreciable extent. Only liquid product was obtained in agreement with this mechanism. Thus, AlEt$_2$Cl or even AlEt$_3$ could be used to alkylate or reduce the TiCl$_4$ as long as the reaction product is AlR$_n$X$_{3-n}$ where $n$ is at least 1 but less than 2.

The runs summarized in table II below were 1 hour runs at −20° C.

TABLE II

| Run | Al cpd. | Mmoles Al/TiCl$_4$ | Diluent | C$_2$H$_4$ (p.s.i.a.) | Liquid olefins, g. | Solid polymer, g. |
|---|---|---|---|---|---|---|
| 10 | AlEtCl$_2$ | 12/1 | C$_6$H$_5$Cl | 150 | 7 | 0 |
| 11 | AlEt$_{1.5}$Cl$_{1.5}$ | 12/1 | C$_6$H$_5$Cl | 158 | 16 | 0 |
| 12 | AlEt$_2$Cl | 12/1 | C$_6$H$_5$Cl | 150 | 3 | 1 48 |
| 13 | AlEt$_2$Cl | 2/2 | Xylene | 165 | 13 | 0 |

[1] Molecular weight=1,670,000.

EXAMPLE 4

The effect of polarity of the reaction solvent on the average molecular weight of the alpha olefin product is shown by the following experiments carried out in the manner described in Examples 2 and 3. Because of the widely different results obtained with the solvents studied, it is difficult to make comparisons under identical conditions. However, the trend of decreasing molecular weight with increasing solvent polarity is clear from the data summarized in Table III.

TABLE III

| Run | Mmoles A/B/C/D [1] | Diluent [2] | C$_2$H$_4$ (p.s.i.a) | $\overline{M}_n$ [3] |
|---|---|---|---|---|
| 14 | 6/6/1/1 | n-Heptane | 165 | [4] 435,000 |
| 15 | 6/6/1/1 | 50% n-Heptane, 50% xylene. | 65 | 148 |
| 16 | 6/6/1/1 | Xylene | 160 | 124 |
| 17 | 6/6/1/1 | C$_6$H$_5$Cl | 160 | 113 |
| 18 | 12/12/2/2 | C$_6$H$_5$Cl | 500 | 147 |
| 19 | 12/12/2/2 | o-C$_6$H$_4$Cl$_2$ | 500 | 142 |
| 20 | 2/0/2/0 | Xylene | 215 | 110 |
| 21 | 2/0/2/0 | CH$_2$Cl$_2$ | 215 | 72 |
| 22 | [5] 4/0/4/0 | C$_2$H$_5$Cl | 165 | 112 |

[1] Catalyst: A, AlEt$_2$Cl/B, AlEtCl$_2$/C, TiCl$_4$/D, t-BuOH, pretreated +10° C. for 30 minutes.
[2] 500 ml. diluent, −20° C., 1 hour.
[3] Number average molecular weight of total olefin product.
[4] No activity at −20° C. Only high molecular weight solid polymer was obtained upon increasing the temperature to +30° C.
[5] Pretreated at −20° C. for 30 minutes.

TABLE I

| Run | Mmoles [1] A/B/C/D | Diluent | Hours | C$_2$H$_4$ (p.s.i.a.) | G. product/ g. TiCl$_4$/hr. | $\overline{M}_n$ [3] | Percent linear olefins in C$_{12-20}$ |
|---|---|---|---|---|---|---|---|
| 3 | 12/12/2/2 | C$_6$H$_5$Cl | 1 | [2] 15 | 45 | 98.8 | 67 |
| 4 | 12/12/2/2 | C$_6$H$_5$Cl | 1 | 55 | 95 | 100.5 | 70 |
| 5 | 12/12/2/2 | Xylene | 1 | 140 | 105 | 121.4 | 98 |
| 6 | 6/6/1/1 | C$_6$H$_5$Cl | 1 | 165 | 147 | 112.6 | 97 |
| 7 | 3/3/0.5/0.5 | C$_6$H$_5$Cl | 2 | 250 | 74 | 121.3 | 99 |
| 8 | 12/12/2/2 | Xylene | 1 | 250 | 97 | 140.0 | 100 |
| 9 | 12/12/2/2 | C$_6$H$_5$Cl | 0.5 | 500 | 126 | 147.0 | 100 |

[1] Catalyst: A, AlEt$_2$Cl/B, AlEtCl$_2$/C, TiCl$_4$/D, t-BuOH.
[2] Gaseous ethylene bubbled continuously through diluent at atmospheric pressure.
[3] Number average molecular weight of total olefin product.

Saturated, nonpolar solvents are completely ineffective because they are inactive at the low temperatures needed to make liquid olefins, and they yield only plastics range molecular weight (above about 20,000) at higher temperatures (Run 14). Aromatic solvents are excellent (Run 16). The desired product is also obtainable when 50 volume percent of the aromatic is replaced by an aliphatic solvent under suitable conditions (Run 15), but the molecular weight would have been much higher if run at 150 p.s.i.a. The order of decreasing molecular weight with increasing solvent polarity for aliphatics is evident from Runs 14 to 17 and 18 to 19. Comparison of Runs 20, 21 and 22 shows that halogenated aliphatics produce the lowest molecular weight products. In Example 6 it is shown that the highest yields of detergent range olefins ($C_{10-20}$) are obtained when the number average molecular weight is in the range between about 100 and 170. Therefore, the aromatics and halogenated aromatics are most preferred, although some halogenated aliphatic solvents could be used at considerably higher pressures.

EXAMPLE 5

Reaction temperature must be controlled to a rather narrow, critical range in order to achieve high selectivities to $C_{10}$ to $C_{20}$ linear olefins. Experiments were performed as described in Example 4, except that polymerization temperature was varied at constant catalyst, diluent, and pressure. The results are summarized in Table IV below:

TABLE IV

| Run | Mmoles A/B/C/D [1] | Diluent [2] | $C_2H_4$ (p.s.i.a.) | Temp., °C. | $\overline{M}_n$ |
|---|---|---|---|---|---|
| 23 | 6/6/1/1 | $C_6H_5Cl$ | 150 | 0 | 137 |
| 24 | 6/6/1/1 | $C_6H_5Cl$ | 150 | −20 | 109 |
| 25 | 6/6/1/1 | $C_6H_5Cl$ | 150 | −30 | 100 |
| 26 | 4/4/2/0 | Xylene | 120 | 0 | 148 |
| 27 | 4/4/2/0 | ....do.... | 120 | −20 | 111 |

[1] Catalyst: A, $AlEt_2Cl$/B, $AlEtCl_2$/C, $TiCl_4$/D, t-BuOH.
[2] 500 ml. diluent, 1 hour.

The average molecular weight increases with temperature for this catalyst system as shown in Table IV. It can also be seen from Table IV that the more polar solvents must be used at higher temperatures to achieve the desired molecular weight at any given ethylene pressure. However, there is an upper temperature limit, even with the halogenated solvents, at which the catalyst changes into the conventional Ziegler-type catalyst and produces mainly plastics range (high molecular weight) polyethylene. This upper limit is dependent upon solvent polarity and is in the range of about +15 to +25° C. A lower temperature limit also exists which is dependent upon solvent polarity and ethylene pressure. As shown in Table IV, the lower temperature limits for chlorobenzene and xylene are about −20° to −30° C. at 150 p.s.i.a. It will be understood, however, that these temperatures could be slightly lower at higher ethylene pressures and still produce the desired average molecular weight linear olefins. Considering the interactions between catalyst composition, solvent polarity and ethylene pressure, the temperature range is about −30° to +10° C. for making detergent-range ($C_{10}$ to $C_{20}$) linear olefins.

EXAMPLE 6

The previously known branched, lubricating oil products which were made using similar catalysts, solvents and temperatures are characterized by a Poisson-type product distribution. The linear alpha olefins of this invention have been found to have a simple exponential distribution which corresponds to that which is commonly known as Flory's "most probable" distribution (P. J. Flory, "Principles of Polymer Chemistry," pages 334 to 339). Since the maximum theoretical yields of higher molecular weight olefins are lower for the simple exponential distribution than for a Poisson-type distribution, it is of critical importance to be able (1) to determine the theoretical limitations on selectivity which are imposed by the type of distribution, and (2) to find the critical conditions which produce the molecular weight average which yields maximum selectivity. For a simple exponential distribution, the optimum average molecular weight does not usually coincide with the average molecular weight of the most desirable products. Thus, a special procedure was developed to permit determination of the critical conditions. This is illustrated below for the detergent-range linear olefins ($C_{10}$ to $C_{20}$) but is applicable to any other desired range.

A simple exponential distribution produces a straight line on a plot of log mole percent versus degree of polymerization. Except for small losses of butene-1 and hexene-1 due to volatility, the experimental data for the products of this invention fall within about 10% of the theoretical straight line. By relating the slope of each straight line to the number average molecular weight and then relating the latter to the selectivity to $C_{10}$ to $C_{20}$ olefins, it was found that there was a maximum selectivity of about 47 weight percent at a number average molecular weight of 134 for total product. In other words, selectivity decreases at both higher and lower average molecular weights. Therefore, in a process for making $C_{10}$ to $C_{20}$ olefins, depending upon whether the $C_4$ to $C_8$ or the $C_{22+}$ by-products are more valuable, the average molecular weight of the total product should thus be between about 100 and 170, preferably 120 to 145.

EXAMPLE 7

In other experiments similar to Examples 2 and 3, it has been found that (1) activity can be increased by pretreating the catalyst for a few minutes to several hours at temperatures below 25° C. (2) $TiCl_4$ can be replaced by $TiBr_4$ or $TiCl_3$OR where R=alkyl, aryl, aralkyl, cycloalkyl or benzoyl (3) $TiCl_4$ cannot be replaced by $VCl_4$ or $FeCl_3$ because they produce high molecular weight polyethylene under the conditions described in Example 2 (4) replacing the $AlEt_2Cl$ of Run 13 with $AlBu_2Cl$ or $AlMe_{1.5}Br_{1.5}$ gave substantially similar results, but phenyl aluminum chlorides were unsatisfactory and gave only high polymer, (5) t-butanol may be replaced by other alcohols, phenols, carboxylic acids and related compounds, and (6) Lewis bases such as ethers, tertiary amines or pyridine decrease catalyst activity.

EXAMPLE 8

A polymerization was carried out at −60° C. and 60 p.s.i.a. ethylene pressure using 6 mmoles $AlEt_2Cl$ and 4 mmoles $TiCl_4$ in 250 ml. xylene. After 1 hour, product concentration was 11.2 weight percent, product linearity was 98.8 mole percent in the $C_{12}$ to $C_{20}$ fraction, and $\overline{M}_n$ was 75.9. The ethylene/product olefin mole ratio was 8.1.

This example illustrates that very low temperatures may be used and that low molecular weight products are obtained under these conditions.

It is to be understood that this invention is not limited to the specific examples which have been offered merely as illustrations and that modifications may be made without departing from the spirit of the invention as set forth in the claims.

What is claimed is:
1. The process for selectively preparing linear olefins having a number average molecular weight of about 70 to 300, which comprises polymerizing an ethylene-containing gas in the presence of a substantially soluble catalyst consisting of the reaction product of a transition metal halide selected from the group consisting of $TiX_4$, $TiX_3OR'$, $TiX_3OOCR'$, wherein X is selected from the group consisting of chlorine and bromine and R' is selected from the group consisting of alkyl, aralkyl, and cycloalkyl, and an aluminum alkyl compound such that the ultimate formula of the aluminum alkyl compound is $AlR_nX_{3-n}$, wherein R is selected from the group consisting of alkyl, aralkyl and cycloalkyl, X is selected from the group consisting of chlorine, bromine and iodine, and $n$ is at least 1 but less than 2 in the presence of a diluent selected from the group consisting of aromatic hydrocarbons and halogenated hydrocarbons, at a temperature of less than 25° C. and an ethylene pressure above 50 p.s.i.a., wherein the mole ratio of ethylene to the reaction product is above 0.8 throughout the reaction and recovering the reaction product comprising at least 90 mole percent linear olefins in which the product olefin concentration is greater than 5 weight percent based on the diluent and reaction product.

2. A process as in claim 1 wherein said transition metal halide is $TiCl_4$.

3. A process as in claim 1 wherein said ratio of ethylene to the reaction product is above about 2.0.

4. A process as in claim 1 wherein the diluent is an aromatic hydrocarbon.

5. A process as in claim 1 wherein the diluent is a halogenated aromatic hydrocarbon.

6. A process for selectively preparing linear alpha olefins having a number average molecular weight of about 70 to 300 which comprises polymerizing an ethylene-containing gas in the presence of a soluble catalyst consisting of the reaction products of $TiCl_4$ and an aluminum alkyl compound such that the ultimate formula of the aluminum alkyl compound is $AlR_nX_{3-n}$, wherein R is ethyl and X is selected from the group consisting of bromine, chlorine and iodine and $n$ is at least 1 but less than 2 in the presence of a diluent consisting of an aromatic hydrocarbon at a temperature of less than 25° C. and an ethylene pressure above that 100 p.s.i.a., wherein the mole ratio of ethylene to the reaction product is above 0.8 throughout the reaction and recovering the reaction product comprising at least 90 mole percent linear alpha olefins in which the product olefin concentration is greater than 5 weight percent based on the diluent and reaction product.

7. A process as in claim 6 wherein said aluminum alkyl compound is diethyl aluminum chloride.

8. A process as in claim 6 wherein the diluent is xylene.

9. A process as in claim 6 wherein the pressure is above about 500 p.s.i.a.

10. A process as in claim 6 wherein the olefin concentration in the reaction product is greater than 10 weight percent based on the diluent and reaction product.

No references cited.

PAUL M. COUGHLAN, JR., *Primary Examiner.*

U.S. Cl. X.R.

260—94.9